(12) United States Patent  (10) Patent No.: US 6,369,359 B1
Morrison  (45) Date of Patent: Apr. 9, 2002

(54) SELF-FEEDING SOLDERING DEVICE

(76) Inventor: Terry H. Morrison, 6221 N. 22nd Dr., Phoenix, AZ (US) 85015

( * ) Notice: Subject to any disclaimer, the term of this patent is extended or adjusted under 35 U.S.C. 154(b) by 0 days.

(21) Appl. No.: 09/710,642

(22) Filed: Nov. 8, 2000

(51) Int. Cl.⁷ .............................. B23K 3/03; B23K 3/06
(52) U.S. Cl. ..................... 219/229; 219/241; 219/230; 228/53
(58) Field of Search ................................. 219/229–241; 228/52, 53, 41; 226/189, 127, 153, 155

(56) References Cited

U.S. PATENT DOCUMENTS

| | | | | |
|---|---|---|---|---|
| 2,432,428 A | * | 12/1947 | Lang | 228/52 |
| 2,871,333 A | * | 1/1959 | Savage | 228/53 |
| 3,211,355 A | * | 10/1965 | Zottai | 228/52 |
| 3,539,766 A | * | 11/1970 | Eder | 219/241 |
| 3,707,258 A | * | 12/1972 | Schlitt | 228/52 |
| 3,796,856 A | * | 3/1974 | Wei-Cheng | 219/230 |
| 3,852,565 A | * | 12/1974 | Kager | 219/241 |
| 3,990,622 A | * | 11/1976 | Schurman, Jr. et al. | 228/53 |
| 4,614,295 A | * | 9/1986 | Kochli | 228/53 |
| 4,891,497 A | * | 1/1990 | Yoshimura | 219/241 |
| 5,122,637 A | * | 6/1992 | Bottorff et al. | 219/241 |
| 5,412,178 A | * | 5/1995 | Tamura | 219/241 |
| 5,837,973 A | * | 11/1998 | Tamura | 219/241 |

FOREIGN PATENT DOCUMENTS

| | | | | |
|---|---|---|---|---|
| GB | 1446044 | * | 8/1976 | 219/241 |
| JP | 4-288966 | * | 10/1992 | |
| WO | 88/06503 | * | 9/1988 | 219/241 |

* cited by examiner

*Primary Examiner*—John A. Jeffery
(74) *Attorney, Agent, or Firm*—Joseph N. Breaux

(57) ABSTRACT

A self feeding soldering device includes a soldering device; a solder feed mechanism carried on the soldering device; and a solder system controller in controlling connection with the soldering device and the solder feed mechanism. The solder feed mechanism allows the user to control the feed of solder wire onto the heated soldering tip of the soldering device or the area adjacent to the heated soldering tip to be soldered to free one hand of the user to secure the objects to be soldered.

1 Claim, 6 Drawing Sheets

SELF-FEEDING SOLDERING DEVICE

TECHNICAL FIELD

The present invention relates to soldering equipment and more particularly to a self-feeding soldering device including a soldering assembly, a solder feed mechanism carried on the soldering assembly, and a solder system controller in controlling connection with the soldering assembly and the solder feed mechanism; the soldering assembly including: a pistol grip housing, an electrical resistance cartridge heater element housed within a high heat conductivity barrel supported by the pistol grip housing, a detachable soldering tip having a barrel connecting end detachably connectable to an end of the high heat conductivity barrel, a solder dispensing surface having a solder dispensing opening in connection with a solder passageway formed through the soldering tip between a soldering tip solder insertion side opening and solder dispensing opening, a tip temperature sensor having a temperature sensing transducer mechanically connected to the soldering tip and having an insulated transducer output line extending from the temperature sensing transducer into connection with a temperature sensor input of the solder system controller, and a heater element power supply having a power output in connection with the heater element, and a manually positionable soldering iron tip temperature selection knob having an output in connection with a temperature select input of the solder system controller, the solder system controller being programmed to control the heater element power supply in a manner such that the soldering iron tip is maintained at the selected temperature; the solder feed mechanism being in mechanical connection with the soldering assembly and including a spindle structure for rotatably supporting a spool of solder wire, a variable speed solder wire pinch feed assembly including a freewheeling top resilient roller and a motor driven bottom resilient roller, driven by a variable speed motor and between which a section of the solder wire from the spool of solder wire rotatably mounted on the spindle structure is positioned and frictionally driven by the resilient rollers toward an inlet of a first solder wire guide tube positioned adjacent to the output side of the two resilient rollers, the first solder wire guide tube directing the end of the solder wire to a thermal insulation gap provided between the outlet end of the first solder wire guide tube and an inlet opening of a second solder wire guide tube, the second solder wire guide tube having a solder wire outlet end in connection with the soldering tip solder insertion side opening of the solder tip; the variable speed motor of the motor driven bottom resilient roller being controlled by a feed mechanism motor on/off switch and a trigger activated feed mechanism motor speed controller for allowing the user to control the speed of the solder feed mechanism with the trigger activated feed mechanism motor speed controller between a no-feed condition to a full-speed feed condition depending on the job being performed. In a preferred embodiment, the variable speed motor is coupled to the motor driven bottom resilient roller by a gear box and includes a slip clutch assembly for preventing solder wire from being continuously forced into a tangled mess should a jamb occur in one of the first or second solder wire guide tubes. In another preferred embodiment the self-feeding soldering device also includes a flashlight source having a light source aimed at the solder tip to illuminate the work area so that the self-feeding soldering device user may more clearly view the items to be soldered together.

BACKGROUND OF INVENTION

Soldering two items together using a conventional soldering iron or gun and spool of solder wire requires the two elements being soldered together to be held in a fixed relation while the tip of the soldering device is used to heat the two elements and the tip end of the spool of wire solder is rubbed against one or more of the elements to be soldered together. Although once this is accomplished the solder joint is effective, it can be difficult, when in cramped conditions, to hold the two elements together while simultaneously heating them with a soldering device and then rapidly feeding the solder wire onto the elements while they are still hot enough to melt the solder. It would be desirable, therefore, to have a soldering device that included a quantity of solder wire which could be automatically fed to the heated solder tip of the soldering device so that one hand of the user would remain free for holding one of the elements against the other element being soldered.

SUMMARY OF INVENTION

It is thus an object of the invention to provide a self-feeding soldering device that includes a soldering assembly, a solder feed mechanism carried on the soldering assembly, and a solder system controller in controlling connection with the soldering assembly and the solder feed mechanism; the soldering assembly including: a pistol grip housing, an electrical resistance cartridge heater element housed within a high heat conductivity barrel supported by the pistol grip housing, a detachable soldering tip having a barrel connecting end detachably connectable to an end of the high heat conductivity barrel, a solder dispensing surface having a solder dispensing opening in connection with a solder passageway formed through the soldering tip between a soldering tip solder insertion side opening and solder dispensing opening, a tip temperature sensor having a temperature sensing transducer mechanically connected to the soldering tip and having an insulated transducer output line extending from the temperature sensing transducer into connection with a temperature sensor input of the solder system controller, and a heater element power supply having a a power output in connection with the heater element, and a manually positionable soldering iron tip temperature selection knob having an output in connection with a temperature select input of the solder system controller, the solder system controller being programmed to control the heater element power supply in a manner such that the soldering iron tip is maintained at the selected temperature; the solder feed mechanism being in mechanical connection with the soldering assembly and including a spindle structure for rotatably supporting a spool of solder wire, a variable speed solder wire pinch feed assembly including a freewheeling top resilient roller and a motor driven bottom resilient roller, driven by a variable speed motor and between which a section of the solder wire from the spool of solder wire rotatably mounted on the spindle structure is positioned and frictionally driven by the resilient rollers toward an inlet of a first solder wire guide tube positioned adjacent to the output side of the two resilient rollers, the first solder wire guide tube directing the end of the solder wire to a thermal insulation gap provided between the outlet end of the first solder wire guide tube and an inlet opening of a second solder wire guide tube, the second solder wire guide tube having a solder wire outlet end in connection with the soldering tip solder insertion side opening of the solder tip; the variable speed motor of the motor driven bottom resilient roller being controlled by a feed mechanism motor on/off switch and a trigger activated feed mechanism motor speed controller for allowing the user to control the speed of the solder feed mechanism with the trigger activated feed mechanism motor speed controller between a no-feed condition to a full-speed feed condition depending on the job being performed. In a preferred embodiment, the variable speed motor is coupled to the motor driven bottom resilient roller by a gear box and includes a slip clutch assembly for preventing solder wire from being continuously forced into a tangled mess should a jamb occur in one of the first or second solder wire guide tubes. In another preferred embodiment the self-feeding soldering also includes a flashlight source having a light source aimed at the solder tip to illuminate the work area so that the self-feeding soldering user more clearly view the items to be soldered together.

Accordingly, a self-feeding soldering device is provided. The self-feeding soldering device includes a soldering assembly, a solder feed mechanism carried on the soldering assembly, and a solder system controller in controlling connection with the soldering assembly and the solder feed mechanism in a manner to control the feed of solder to a soldering area of a solder tip of the soldering assembly; the soldering assembly including: a pistol grip housing, an electrical resistance cartridge heater element housed within a high heat conductivity barrel supported by the pistol grip housing, a detachable soldering tip having a barrel connecting end detachably connectable to an end of the high heat conductivity barrel, a solder dispensing surface having a solder dispensing opening in connection with a solder passageway formed through the soldering tip between a soldering tip solder insertion side opening and solder dispensing opening, a tip temperature sensor having a temperature sensing transducer mechanically connected to the soldering tip and having an insulated transducer output line extending from the temperature sensing transducer into connection with a temperature sensor input of the solder system controller, and a heater element power supply having a power output in connection with the heater element, and a manually positionable soldering iron tip temperature selection knob having an output in connection with a temperature select input of the solder system controller, the solder system controller being programmed to control the heater element power supply in a manner such that the soldering iron tip is maintained at the selected temperature; the solder feed mechanism being in mechanical connection with the soldering assembly and including a spindle structure for rotatably supporting a spool of solder wire, a variable speed solder wire pinch feed assembly including a freewheeling top resilient roller and a motor driven bottom resilient roller, driven by a variable speed motor and between which a section of the solder wire from the spool of solder wire rotatably mounted on the spindle structure is positioned and frictionally driven by the resilient rollers toward an inlet of a first solder wire guide tube positioned adjacent to the output side of the two resilient rollers, the first solder wire guide tube directing the end of the solder wire to a thermal insulation gap provided between the outlet end of the first solder wire guide tube and an inlet opening of a second solder wire guide tube, the second solder wire guide tube having a solder wire outlet end in connection with the soldering tip solder insertion side opening of the solder tip; the variable speed motor of the motor driven bottom resilient roller being controlled by a feed mechanism motor on/off switch and a trigger activated feed mechanism motor speed controller for allowing the user to control the speed of the solder feed mechanism with the trigger activated feed mechanism motor speed controller between a no-feed condition to a full-speed feed condition depending on the job being performed. In a preferred embodiment, the variable speed motor is coupled to the motor driven bottom resilient roller by a gear box and includes a slip clutch assembly for preventing solder wire from being continuously forced into a tangled mess should a jamb occur in one of the first or second solder wire guide tubes. In another preferred embodiment the self-feeding soldering also includes a flashlight source having a light source aimed at the solder tip to illuminate the work area so that the self-feeding soldering user more clearly view the items to be soldered together.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY EMBODIMENTS

Figure 1:
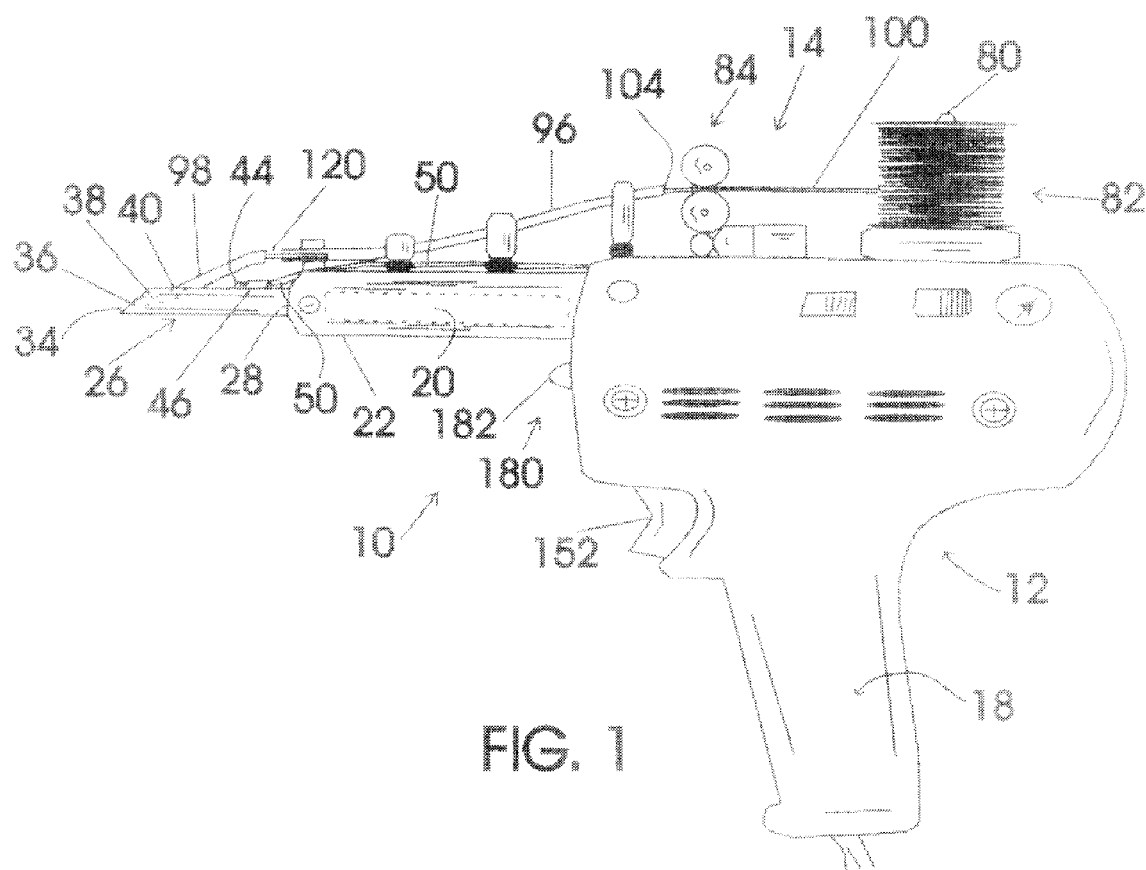
FIG. 1 shows an exemplary embodiment of the self-feeding soldering device of the present invention showing the soldering device and the feed mechanism including the solder cartridge.
Figure 2:
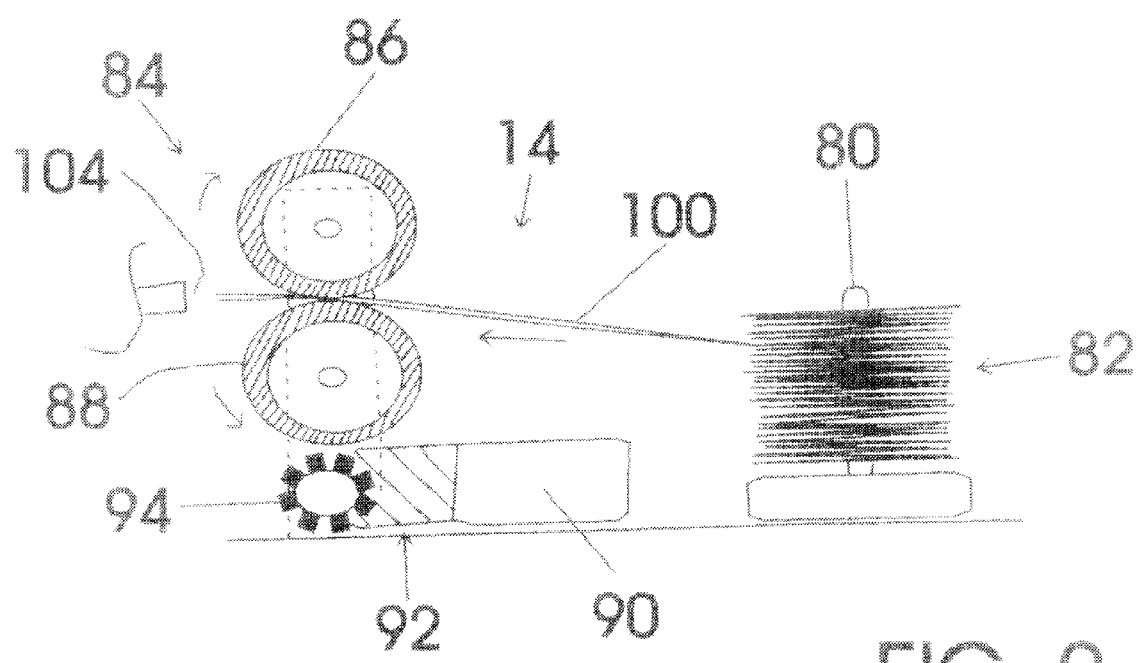
FIG. 2 is a top plan view of the self-feeding soldering device of FIG. 1.
Figure 3:
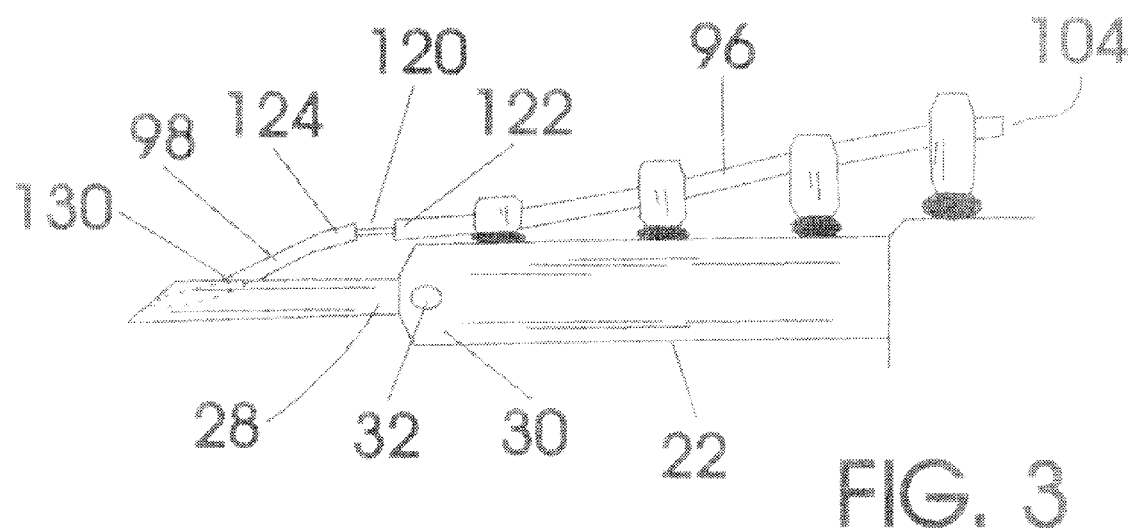
FIG. 3 is a detail view of the tip and associated solder wire guide tubes.
Figure 4:
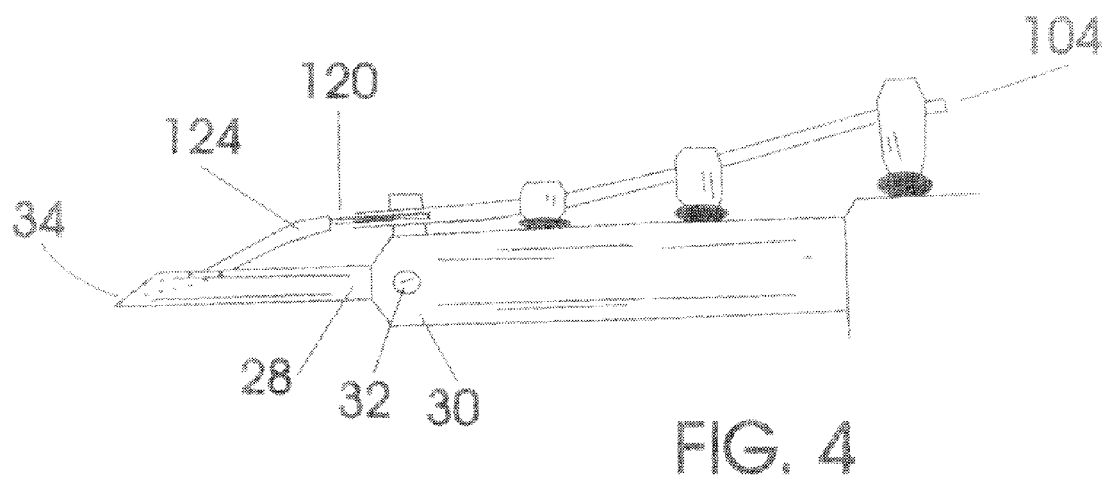
FIG. 4 is another detail view of the tip and associated solder wire guide tubes.

FIGS. 1–6 various exemplary embodiment of the self-feeding soldering device of the present invention generally designated 10. Self-feeding soldering device 10 includes a soldering assembly, in the embodiment a solder gun assembly, generally designated 12; a solder feed mechanism, generally designated 14, carried on the soldering assembly 12; and a solder system controller, generally designated 16, in controlling connection with soldering assembly 12 and solder feed mechanism 14.

Solder gun assembly 12 includes: a molded plastic pistol grip housing, generally designated 18; an electrical resistance cartridge heater element 20 (shown in dashed lines) housed within a high heat conductivity barrel 22 supported by the pistol grip housing 18; a detachable soldering tip, generally designated 26, having a barrel connecting end 28 detachably connectable to an end 30 of high heat conductivity barrel 22 with a set screw 32; a solder dispensing surface 34 having a solder dispensing opening 36 in connection with a solder passageway 38 (shown in dashed lines) formed through soldering tip 26 between soldering tip solder insertion side opening 40 and solder dispensing opening 36; a tip temperature sensor, generally designated 44, having a temperature sensing transducer 46 mechanically connected to soldering tip 26 and having an insulated transducer output line 50 extending from the temperature sensing transducer 46 into connection with a temperature sensor input 54 of solder system controller 16; and a heater element power supply 60 having a power output 62 in connection with the cartridge heater element 22; a manually positionable soldering iron tip temperature selection knob 66 having an output 68 in connection with a temperature select input of the solder system controller 16, and an at operating temperature indicator light 70 in connection with an output of solder system controller 16. The solder system controller 16 is programmed to control the heater element power supply 60 in a manner such that the cartridge heater element 22 maintains the soldering iron tip 26 at the selected temperature.

Solder feed mechanism 14 is in mechanical connection with solder gun assembly 12 and includes a spindle structure for rotatably supporting a spool of solder wire, generally designated 82, and a variable speed solder wire pinch feed assembly, generally designated 84, including a freewheeling top resilient roller 86 and a motor driven bottom resilient roller 88. In the embodiment shown in FIG. 2, resilient roller 88 is coupled to a variable speed motor 90 a gear box, generally designated 92, including a slip clutch assembly 94. Slip clutch assembly 94 slips when roller 88 meets a predetermined resistance and helps prevent solder wire from being continuously forced into a tangled mess when a jamb occurs in one of the first or second solder wire guide tubes 96,98.

During operation, solder wire 100 from spool of solder wire spool 82 is fed and frictionally gripped between freewheeling roller 86 and variable speed motor driven resilient roller 88. As free-wheeling roller 86 and variable speed motor driven resilient roller 88 rotate solder wire 100 is pulled from solder wire spool and forced into an inlet 104 of a first solder wire guide tube 96 that is positioned adjacent to the output side of resilient rollers 86,88. First solder wire guide tube 96 directs solder wire 100 to a thermal insulation gap 120 that is provided between the outlet end 122 of first solder wire guide tube 96 and an inlet opening 124 of second solder wire guide tube 98. Second solder wire guide tube 98 has a solder wire outlet end 30 in connection with soldering tip solder insertion side opening 40 of solder tip 26.

Variable speed motor 90 of motor driven bottom resilient roller 88 is controlled by a feed mechanism motor on/off switch 150 and a trigger activated feed mechanism motor speed controller 152 for allowing the user to control the speed of the solder feed mechanism 14 for a particular job with the trigger activated feed mechanism motor speed controller 152. Trigger activated feed mechanism motor speed controller 152 is operable to control variable speed motor 90 between a no-feed condition (full stop) to a full-speed feed condition (top speed) depending on the job being performed. In this embodiment, self-feeding device gun 10 also includes a flashlight source, generally designated 180 having a light source 182 aimed at solder tip 26 to illuminate the work area so that the user of self-feeding soldering device 10 may more clearly view the items to be soldered together. Light source 182 is controlled by on/off switch 186.

Figure 5:
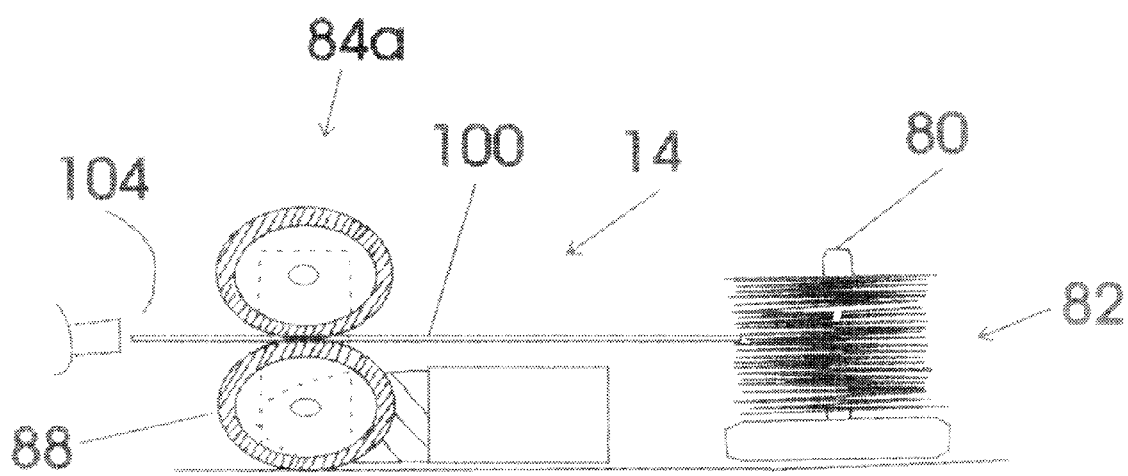
FIG. 5 is a second embodiment of the variable speed solder wire pinch feed assembly.
Figure 6:
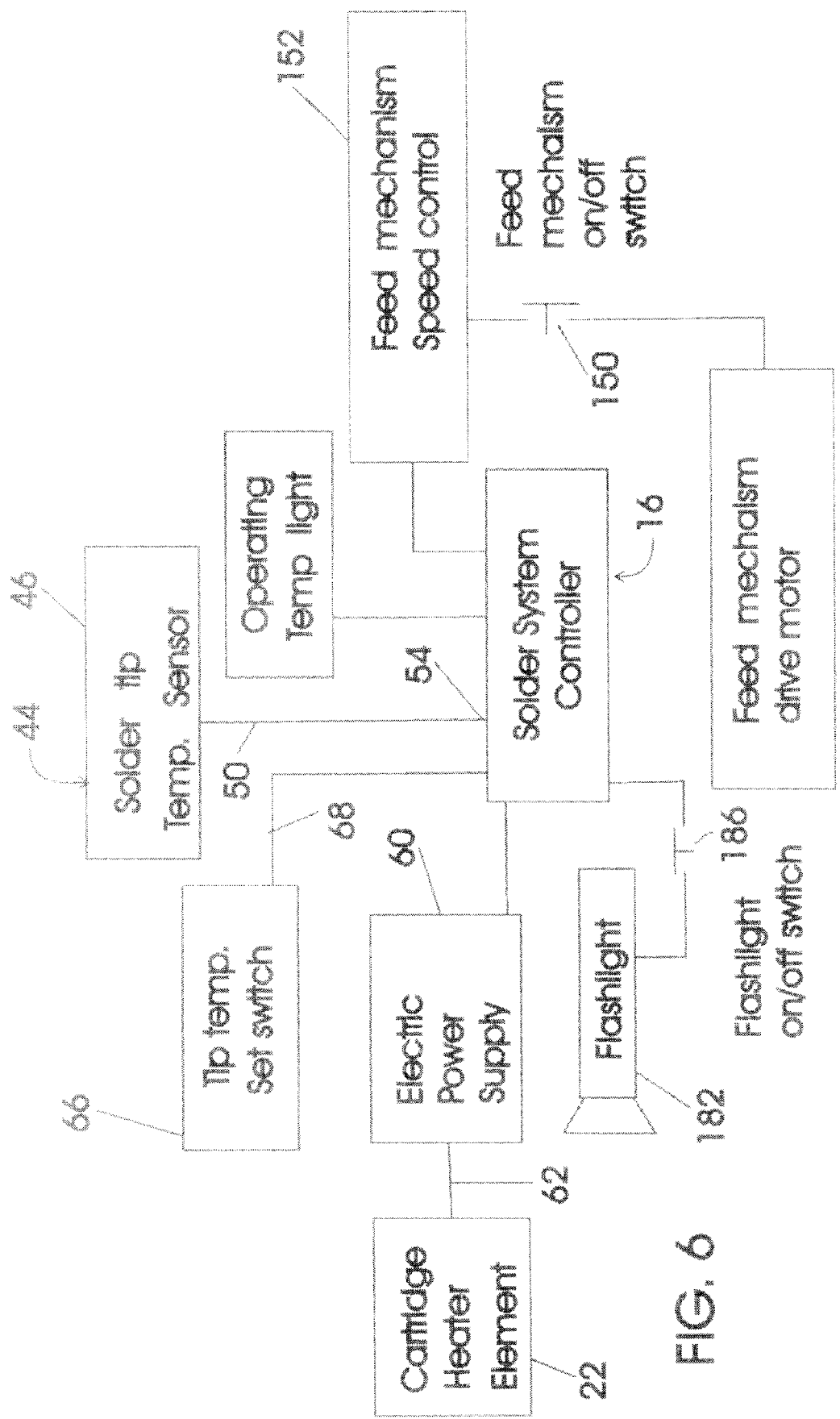
FIG. 6 is an electronic block diagram of the self-feeding soldering device.

FIG. 5 show a second exemplary embodiment of the variable speed solder wire pinch feed assembly, generally designated 84*a*. Variable speed solder wire pinch feed assembly 84*a* is substantially identical to variable speed solder wire pinch feed assembly 84 (FIG. 2) except that motor driven bottom resilient roller 88 is directly coupled to variable speed motor 90 by gear box 92 and slip clutch assembly 94 is eliminated.

It can be seen from the preceding description that a self-feeding soldering device has been provided.

It is noted that the embodiment of the self-feeding soldering device described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A self-feeding soldering device comprising:

a soldering assembly;

a solder feed mechanism carried on the soldering assembly; and a solder system controller in controlling connection with the soldering assembly and the solder feed mechanism in a manner to cause the solder feed mechanism to feed solder to a site to be soldered;

the soldering assembly including:
  a housing,
  an electrical resistance heater element housed within a high heat conductivity barrel supported by the housing,
  a detachable soldering tip having a barrel connecting end detachably connectable to an end of the high heat conductivity barrel;
  a solder dispensing surface having a solder dispensing opening in connection with a solder passageway formed through the soldering tip between a soldering tip solder insertion side opening and solder dispensing opening,
  a tip temperature sensor having a temperature sensing transducer mechanically connected to the soldering tip and having an insulated transducer output line extending from the temperature sensing transducer into connection with a temperature sensor input of the solder system controller,
  a heater element power supply having a power output in connection with the heater element, and
  a user selectable soldering iron tip temperature selector having an output in connection with a temperature select input of the solder system controllers;

the solder system controller being programmed to control the heater element power supply in a manner such that the soldering iron tip is maintained at the selected temperature;

the solder feed mechanism including:
  a first solder wire guide tube,
  a second wire guide tube,
  a spindle structure for rotatably supporting a spool of solder wire, and
  a variable speed motor driven solder wire pinch feed assembly having an output side;

the variable speed solder wire pinch feed asseably including a freewheeling top resilient roller and a motor driven bottom resilient roller, the motor driven bottom resilient roller being coupled to a variable speed motor through a gear box including a slip clutch assembly;

the operating speed of the variable speed motor being controlled by a trigger activated feed mechanism motor speed controller;

the first solder wire guide tube having a first solder wire guide tube solder wire inlet and a first solder wire guide tube solder wire outlet end, the first solder wire guide tube solder wire inlet being positioned adjacent to the output side of the variable speed solder wire pinch feed assembly;

the second solder wire guide tube having a second solder wire guide solder wire inlet opening and a second solder wire guide tuba solder wire outlet end;

the second solder wire guide solder wire inlet opening being positioned apart from the first solder wire guide tube solder wire outlet end to form a thermal insulation gap between the first solder wire guide tube and the second solder wire guide tube;

the second solder wire guide tube solder wire outlet end being in connection with the soldering tip solder insertion side opening of the soldering tip such that solder wire driven from the output side of the variable speed solder wire pinch feed assembly is forced through the first solder wire guide tube between the first solder wire guide tube solder wire inlet and the first solder wire guide tube solder wire outlet end, across the thermal insulation gap between the first solder wire guide tube and the second solder wire guide tube; through the second solder wire guide tube between the second solder wire guide solder wire inlet opening and the second solder wire guide tube solder wire outlet end; and through the soldering tip between the soldering tip solder insertion side opening and the solder dispensing opening onto a surface to be soldered.

\* \* \* \* \*